Patented May 27, 1924.

1,495,855

UNITED STATES PATENT OFFICE.

GEORGE M. LITTLE, OF PITTSBURGH, PENNSYLVANIA, ASSIGNOR TO WESTINGHOUSE ELECTRIC & MANUFACTURING COMPANY, A CORPORATION OF PENNSYLVANIA.

RESISTANCE ROD.

No Drawing.     Application filed December 16, 1920. Serial No. 431,283.

*To all whom it may concern:*

Bt it known that I, GEORGE M. LITTLE, a citizen of the United States, and a resident of Pittsburgh, in the county of Allegheny and State of Pennsylvania, have invented a new and useful Improvement in Resistance Rods, of which the following is a specification.

My invention relates to a composition of matter designed for use as an electrical conductor in places where conductors of high resistance are required, as in lighting arrestors, and to its method of production.

More particularly, my invention relates to the article and method of production of resistors, known as stick or rod resistors, in which materials of electrically high resistance are molded into the form of sticks, and to means for producing a stick or rod of high efficiency and uniform resistance.

In many of the types heretofore used, the great heat of manufacture has so oxidized the rods that they have varied greatly in resistance. Sometimes rods that passed through practically the same treatment and were composed of substantially the same ingredients would have 100% difference in resistance. It is this unequality of resistance which this invention is intended primarily to adjust. Likewise my invention discloses a composition for resistance rods which has been proved by test to give uniformly good service.

In practicing my invention, I prefer to employ, as materials for the rods, finely powdered carborundum, kaolin and calcined lampblack. The calcined lampblack may be replaced in the mixture by graphite. Though I mention these compounds as giving uniformly good results, it is to be understood that there are many others to which my process is applicable.

In my process, the formed and baked resistance rods are tested to see if they are above or below a certain standard resistance, which, in practice, is generally fixed within 25%, either way, from some fixed resistance. Having ascertained whether the rod lies above or below the standard, it is again subjected to a reheating process to raise or lower its resistance, the degree of reheating applied determining whether the resistance will be raised or lowered.

To make the rods, carborundum is finely powdered, for instance, to about 330 mesh, and to this material is added powdered kaolin and calcined lampblack. The three ingredients are then subjected to a dry mixing. After a thorough dry mixing, water is gradually added to make a stiff dough. The proportion of the ingredients used varies slightly. The following composition has been found very good: finely powdered carborundum about 70%, kaolin about 25%, and calcined lampblack 2% to about 8%. In this mixture, the kaolin is varied when a different percentage of calcined lampblack is desired, and the finely powdered carborundum is kept a constant quantity. In the manufacture of rods, calcined lampblack is preferably utilized, as it makes the rods stronger and the resistance more constant. In place of the calcined lampblack, however, when a low-resistance rod is desired, graphite may be used. In this case the amount of kaolin is kept constant, at about 25%, and graphite from 40% to 10% of the mixture is used, while the quantity of carborundum varies from 65% to 35% of the total.

The dry mixing having been continued to the proper degree and water having been added to form a dough, the latter is extruded through a die and the rods thus formed are kept in a moist atmosphere for about four days. They are then air dried for about four days longer.

Of course, it is to be understood that the greater the percentage of lampblack or graphite used in the mixture, the lower the resistance will be. There are several other factors in the manufacture of the rods up to this point that must be noted, if a uniform product is desired. The time of dry grinding is one of the elements determining resistance, for, if the dry materials are dry ground for a long time, the finished rods will be of higher resistance than if they are ground for a short time. Likewise, the longer the wet mixing is continued the higher will be the resistance. The length of time the wet dough is allowed to stand will effect the resistance of the finished rod; the longer it stands the lower will be the resistance.

If the wet dough or damp rods are heated, the resistance will be lowered, which is also the case if the rods are air dried a shorter time and particularly when fan dried. The converse of this last stated fact is true, for, if the green rods are allowed to dry for a longer period than 4 days, the resistance of the finished rod will be higher, up to a certain limit that has been ascertained to be approximately seven days. Moreover, when the green rods are kept for about three weeks in a moist atmosphere as over a panful of water saturated with salt, the resistance of the finished rods will be higher. Another factor that raises the resistance is to calcine the lampblack at a low temperature—800° to 1300° C., instead of 1800° to 2000° C., and if this lampblack, calcined at a low temperature, is allowed to stand for a considerable period, the resistance will be further raised. Thus, it will be seen that many things may effect the resistance of the finished rods, and, to manufacture standard resistance rods, it is necessary to put them through as uniform a process as possible, keeping in mind the various factors above enumerated, to insure the production of a product as close to a standard as possible.

The dry rods are slipped into closed carbon tubes and are passed slowly through a tube furnace heated to about 1372° C. The rods, as they come from the furnace, may not be inside the limit, that is to say, within 25% over or under a given resistance. The rods having been tested to ascertain whether their resistance is over or under the given amount, the rods are subjected to a reheating process to raise or lower the resistance. I find that, if the rods baked at 1372° C. are repeatedly rebaked in the same manner at 600° C., the resistance is gradually raised. If the rods baked at 1372° C. are repeatedly rebaked in the same manner at 1228° C., the resistance will gradually be lowered. These figures are merely approximate for the two temperatures of rebaking to raise or lower resistance. There is a neutral rebaking point which I have found to be approximately 1120° C. The temperature for the original baking is not absolutely fixed, nor is there a fixed period that the rod should be subjected to that temperature. The rebaking may be done, however, in less time than the original period.

As was the case with the proportion of the materials and the treatment of the green rod before baking, so it is with the baking and rebaking steps. If uniformity is to be obtained, a considerable number of factors must be kept in mind. The resistance of the finished rods will tend to be high if the first baking temperature is greater or less than 1372° C. Likewise, the more rapidly the green rods are put through the furnace, the higher will be the resistance. Again, the baked and particularly the rebaked rods will have their resistance increased if they are subjected to repeated static electrical discharges. The change of resistance in this latter case is small. If the baked rods are allowed to stand, the resistance rises slowly, the increase in resistance being not over 10% for the medium and low resistance rods but more in the case of the rods of high resistance. These factors are some of those which tend to raise the resistance, there are, however, those which tend to lower resistance, such as, baking at slow speed, and soaking the baked rods in water and then subjecting them to repeated static discharges.

There is another feature of my reheating process which can be utilized to advantage in lowering the resistance. This consists in putting the resistance rods in a closed pipe in a reducing atmosphere and quickly heating the rods to red heat for a short period of time, say from five to ten minutes. When the resistance rod is taken from the pipe it will be found that the resistance has been lowered. The amount of reducing gas affects the amount of lowering of resistance. The closed vessel may be furnished with reducing gas by putting a drop of oil in the vessel or on the rods before heating. When oil is used to furnish the reducing atmosphere, the amount of lowering of resistance of course depends on the quantity of oil used, since the quantity of oil determines the quantity of reducing gas. This process is carried out in actual practice by putting oil on the rods, the resistance of which is to be lowered, placing them in the closed carbon tubes, which are then pushed rapidly through the furnace which is kept at a bright red heat.

The heat treating for the purpose of raising the resistance apparently has the equivalent effect of sand papering, since it changes the surface of the rod and so effects the resistance. To support the rods in the reheating process for the purpose of raising the resistance, I have found it convenient to employ a pipe bent in yoke shape, with two parallel arms which are drilled to provide sets of parallel holes. The rods are fitted into these holes, with their ends protruding within the two parallel arms of piping. Since the reheating of these rods is done quickly, the ends protruding through the holes into the interior of the pipe will not be heated to as high a degree as the center portion of the rods. Thus, surface oxidation of the ends of the rods is prevented, which will otherwise take place even when the rods are reheated in a reducing atmosphere, for, even then, when they are pulled out of the oven, they oxidize enough to raise the resistance of the surface a trifle. It is very necessary that the resistance rods have ends of high surface conductivity, for to these ends are attached the terminals of the circuit in which the rod is to be placed. The desired conducting surfaces may be provided by spraying metallic copper on the ends or by electrolytic plating. If the ends of the rod are even slightly oxidized, the coating of metal will make poor contact with the material of the rod and there will be sparking across from the ends toward the center. This sparking is very objectionable and, for this reason, a rod having oxidized ends is commercially undesirable.

The rods treated by the above outlined process will not have their resistance changed in use, provided they are not heated to such a high degree as to commence to show color. If this takes place, the surface of the rod undergoes a change and the resistance will be varied.

Although I have described a resistor of a certain composition in the form of a rod, it is obvious that my composition may be used in various other forms. For instance, I may mold the material in the form of disks which, when assembled, are adapted to provide a variable resistance when subjected to varying pressures. My material may also be used in granular condition for use as a heating resistor in electric furnaces. Such granular composition may also be used as telephone transmitter material.

While I have not shown all the possible modifications, within the spirit of my invention, of which one skilled in the art could conceive, I desire that the invention be limited only by the showing of the prior art and the scope of the appended claims.

I claim as my invention:

1. An electrical resistor comprising kaolin approximately 25%, carborundum approximately 70%, and calcined lampblack from 2% to 8%.

2. An electrical resistor comprising kaolin approximately 25%, carborundum approximately 65%, and graphite approximately 10%.

3. An electrical resistor comprising kaolin approximately 25%, carborundum approximately 35%, and graphite approximately 40%.

4. An electrical resistor comprising kaolin approximately 25%, carborundum from 35% to 65%, graphite from 40% to 10%.

5. An electrical resistance body having a slightly surface-oxidized central portion and unoxidized end surfaces.

6. An electrical resistance body having a central heat-treated portion and ends untreated by heat.

7. An electrical resistor comprising a surface-oxidized central portion and unoxidized end surfaces.

8. The method of making resistors comprising the steps of dry grinding the conducting material and the binder, wet mixing the dry ground mass, forming the resistors, heat treating the formed resistors and reheating the resistors to adjust their resistance.

9. The method of making resistors comprising the steps of dry grinding the conducting materials and the binder, wet mixing the dry ground mass, forming the resistors, drying the formed resistors at atmospheric temperature, and heat treating the resistors and reheating them to adjust their resistance.

10. The method of making resistors comprising the steps of combining the materials, forming the resistors, heat treating the formed resistors at from 1300° C. to 1400° C. and retreating them at from 550° C. to 900° C. in a neutral or oxidizing atmosphere to raise their resistance.

11. The method of making resistors comprising the steps of combining the materials, forming the resistors, subjecting them to a heating treatment at from 1300° C. to 1400° C. and retreating them at 1150° C. to 1300° C. in a neutral or reducing atmosphere to reduce their resistance.

12. The method of making resistors comprising the steps of combining the materials, forming the resistors, heating the formed resistors at approximately 1372° C. and reheating them at approximately 600° C. in a neutral or oxidizing atmosphere to raise their resistance.

13. The method of regulating the resistance of a resistor comprising the steps of heat treating the resistor and reheating it in a reducing atmosphere to red heat to reduce the resistance.

14. The method of making resistors comprising the steps of combining the material, forming the resistors, heat treating the formed resistors at approximately 1372° C. and reheating them at approximately 1228° C. to reduce their resistance.

15. A method of regulating the resistance of a resistor comprising the steps of heat treating the resistor and reheating it in a reducing atmosphere to red heat to reduce its resistance.

16. A method of regulating the resistance of a resistor comprising the steps of heat treating the resistor and reheating it in a reducing atmosphere to reduce its resistance.

In testimony whereof, I have hereunto subscribed my name this 4th day of December, 1920.

GEORGE M. LITTLE.